United States Patent [19]

Tsuchiya et al.

[11] 3,887,641

[45] June 3, 1975

[54] METHOD FOR PRODUCING RESIN FOR PRINTING INK

[75] Inventors: Shozo Tsuchiya; Hideo Hayashi; Hisatake Sato, all of Yokohama, Japan

[73] Assignee: Nippon Oil Company, Ltd., Tokyo, Japan

[22] Filed: Dec. 3, 1973

[21] Appl. No.: 421,040

[30] Foreign Application Priority Data

Dec. 9, 1972  Japan.............................. 47-123034

[52] U.S. Cl. ............... 260/845; 117/38; 260/78.40; 260/848
[51] Int. Cl. ............................................ C08g 37/20
[58] Field of Search ............... 260/848, 845, 78.4 D; 117/38

[56] References Cited
UNITED STATES PATENTS

| | | | |
|---|---|---|---|
| 2,521,359 | 9/1950 | Garber | 260/848 |
| 2,778,806 | 1/1957 | Hutchinson | 260/845 |
| 3,083,174 | 3/1963 | Fefer et al. | 260/848 |
| 3,525,720 | 8/1970 | Wismer et al. | 260/848 |
| 3,775,381 | 11/1973 | Hayashi et al. | 260/78.4 D |

*Primary Examiner*—John C. Bleutge
*Attorney, Agent, or Firm*—Sherman & Shalloway

[57] ABSTRACT

A method for producing a resin for printing ink, which comprises reacting a dicyclopentadiene resin with an unsaturated carboxylic acid or its anhydride to form an acid-modified resin, and reacting the acid-modified resin with a phenolformaldehyde resin at a temperature of 100° to 250°C., the amount of the phenolformaldehyde resin being at least 5 g per 100 g the acid-modified resin, thereby to form a resin having a softening point of at least 100°C.

4 Claims, No Drawings

METHOD FOR PRODUCING RESIN FOR PRINTING INK

This invention relates to a method for producing a novel high-softening modified resin for use in preparation of a printing ink. More specifically, this invention relates to a method for producing a modified resin for printing ink, which comprises reacting an acid-modified resin, which is an adduct formed between an unsaturated carboxylic acid or its anhydride and a hydrocarbon-soluble resin synthesized from cyclopentadiene, dicyclopentadiene or its alkyl-substituted derivative, with a phenol-formaldehyde resin to produce a resin having a softening point of at least 100°C.

Varnishes for printing ink which have previously been in wide use are resin varnishes obtained by dissolving a resin such as an alkylphenol resin, rosin-modified phenol resin, or maleic acid resin in a dry oil such as linseed oil. Of these, the rosin-modified phenol resin has been most frequently used. A vehicle for printing ink comprising the rosin-modified phenol resin and a solvent and/or a drying oil has good quality, but has the defect that the supply of rosin is unstable and its cost is high, because it is a naturally occurring substance. On the other hand, petroleum resin prepared by polymerizing cracked oil fractions obtained in large quantities as by-products in the petroleum petrochemical industry or petroleum have the advantage of stable supply and cost, but their quality is not satisfactory. Thus, resins having satisfactory properties for use in the preparation of printing ink have scarcely been found in the petroleum resins.

The basic properties required of printing ink, especially an offset printing ink, are as follows:

1. It should have suitable values showing flowability, such as viscosity and yield value.
2. Since lines are formed on a flat surface by the contact of water with the ink, an interfacial balance can be maintained between the water-retaining part and the ink-adhering part of the printing press.
3. It should have good dispersibility in pigment.
4. It should give printed matter in which the printed surface has good gloss and which is of uniform quality.
5. It should permit a rapid setting time and a rapid drying time, and should not cause blocking.
6. It should give printed matter in which the printed surface has good abrasion resistance.

It is an object of this invention to provide an inexpensive vehicle having the above properties required of printing ink, especially an offset printing ink, which can supersede the conventional rosin-modified phenolic resin vehicles, and which can be obtained in great quantities from the petrochemical industry.

Investigations of the inventors have led to the discovery that resins obtained by reacting acid-modified resins which are adducts formed between an unsaturated carboxylic acid or its anhydride and a resin synthesized from cyclopentadiene, dicyclopentadiene or its alkyl-substituted derivative, with a phenol-formaldehyde resin meet the requirements of resins for printing ink.

The reaction product formed between a resin synthesized from cyclopentadiene, etc. and a phenol-formaldehyde resin has a high molecular weight, and a bulky structure, and moreover possesses superior solubility in dry oils and high boiling solvents for printing ink. Thus, the printing ink prepared from this modified resin exhibits very superior properties in respect of flowability or gloss, etc. without causing misting.

It has previously been proposed to use a reaction product formed between a commercially available petroleum resin and a phenol-formaldehyde resin as a vehicle for printing ink. This reaction product, however, has insufficient solubility in solvents for use in ink, and inks obtained by using this vehicle are unsatisfactory in respect of flowability and gloss.

It has been known that when dicyclopentadiene is polymerized at a temperature of as high as 250° to 350°C. in the presence of an inert hydrocarbon solvent such as benzene, toluene, xylene or iso-octane, a resin soluble in a hydrocarbon solvent such as benzene, toluene, xylene, cyclohexane, or iso-octane is obtained. Even in the absence of an inert hydrocarbon solvent, heat-polymerization at a temperature of as high as 250° to 350°C. gives a resin that is soluble in a hydrocarbon solvent. The resins so obtained are soluble in a hydrocarbon solvent such as benzene, toluene, xylene, solvent naphtha or No. 5 solvent, but since the dicyclopentadiene resins do not possess a polar group, they have poor dispersibility in pigments. Thus, inks prepared by adding solvents and pigments to the resins give printed matter with the printed surface having non-uniform ink reception and poor gloss. Thus, these resins cannot be used for preparing offset printing inks, as will be shown later by Comparative Examples.

According to this invention, there is provided a method for producing a resin suitable for printing ink, which comprises reacting a dicyclopentadiene (to be defined hereinbelow) with an unsaturated carboxylic acid or its anhydride to form an acid-modified resin, and reacting the acid-modified resin with a phenol-formaldehyde resin at a temperature of 100° to 250°C., the weight of the phenol formaldehyde resin being at least 5 g per 100 g of the acidmodified resin, thereby to form a resin having a softening point of at least 100°C.

The term "cyclopentadiene resin," as used in the present specification and the appended claims, denotes a hydrocarbon-soluble resin which is obtained by polymerizing cyclopentadiene, dicyclopentadiene or an alkyl-substituted derivative or any of these in the presence of absence of an inert hydrocarbon solvent in the absence of a catalyst. The dicyclopentadiene resin per se is well known in the art. One preferred method for producing the dicyclopentadiene resin involves heat polymerizing the above-mentioned monomer at a temperature of 250° to 350°C. for 10 minutes to 10 hours in the absence of a solvent or in the presence of a solvent in which case the concentration of the monomer in the solvent is adjusted to 30 to 80 percent by weight, and then separating the unreacted monomer, oligomers and solvent. Preferably, the heat polymerization is carried out using a solvent because it permits easy removal of the heat of reaction and the control of the molecular weight and softening point of the resulting resin.

In the production of the dicyclopentadiene resin, the molecular weight and softening point of the resulting resin can be controlled by suitably selecting a combination of the concentration of the monomer, the reaction temperature and the reaction time. Preferably, the dicyclopentadiene resin used in this invention has a softening point of at least 70°C. Resins having a high softening point, such as more than 200°C., can be used in this invention, but are not preferred since they frequently contain an insoluble portion when dissolved in a hydrocarbon solvent.

It is not altogether necessary that the cyclopentadiene, dicyclopentadiene or an alkyl-substituted derivative of any of these used as a starting material for the above resin be of high purity. But preferably, the resin should contain at least 80 percent by weight of the cyclopentadiene, dicyclopentadiene or an alkyl-substituted derivative thereof. For example, there can be used a concentrated fraction which is obtained by dimerizing cyclopentadiene and methyl cyclopentadiene contained in a $C_5$ fraction of a by-product of a high temperature thermal cracked oil such as naphtha to form a mixture containing dicyclopentadiene, dimethyl cyclopentadiene, cyclopentadiene/methylcyclopentadiene codimer, cyclopentadiene/isoprene codimer, and cyclopentadiene/piperylene codimer, and then distilling the mixture to remove a greater part of $C_5$ components such as $C_5$ olefin and $C_5$ paraffin.

Where the alkyl-substituted derivative of cyclopentadiene or dicyclopentadiene is used as a material for producing the dicyclopentadiene resin, the alkyl group in the material preferably has 1 to 3 carbon atoms.

The reaction of forming the acid-modified resin from the dicyclopentadiene resin and an unsaturated carboxylic acid or its anhydride may be performed either by a two-step method or by a one-step method. The two-step method comprises heat-polymerizing cyclopentadiene, dicyclopentadiene or its alkyl-substituted derivative to form a dicyclopentadiene resin and then reacting this resin with an unsaturated carboxylic acid or its anhydride. The one-step method involves heat polymerizing the monomer and an unsaturated carboxylic acid or its anhydride simultaneously to produce the acid-modified resin.

A preferred embodiment of the two-step method used in this method comprises adding an unsaturated carboxylic acid or its anhydride to the dicyclopentadiene resin produced under the reaction conditions described hereinabove. According to this method, the acid-modified resin can be produced by adding the unsaturated carboxylic acid or its anhydride in an amount of 0.01 to 0.5 mol per 100 g of the dicyclopentadiene, and allowing them to react with each other in the absence of a catalyst or in the presence of a radical initiator such as an organic peroxide for about 30 minutes to 15 hours at a temperature of 100° to 300°C., preferably 150° to 250°C.

A preferred embodiment of the one-step method used in this invention comprises adding an unsaturated carboxylic acid or its anhydride to the reaction system of heat polymerizing cyclopentadiene, dicyclopentadiene or its alkyl-substituted derivative in the presence or absence of a solvent at a temperature of 170° to 350°C. The carboxylic acid or its anhydride is added to the reaction system before or during the polymerization.

The unsaturated carboxylic acid or its anhydride used in this invention has 3 to 16 carbon atoms. Examples of suitable unsaturated carboxylic acids or anhydrides thereof are acrylic acid, methacrylic acid, maleic acid, maleic anhydride, tetrahydrophthalic acid, tetrahydrophthalic anhydride, fumaric acid, citraconic acid, and itaconic acid.

The suitable ratio of the dicyclopentadiene resin and the unsaturated carboxylic acid or its anhydride to be added to it in the two-step method is such that 0.01 to 0.5 mol of the unsaturated carboxylic acid or its anhydride is used per 100 g of the dicyclopentadiene resin. If the amount of the unsaturated carboxylic acid or its anhydride is smaller than 0.01 mol per 100 g of the dicyclopentadiene resin, the amount of the polar group of the resin to which the acid has been added is small, in which case the resin has poor dispersibility in pigments and an offset printing ink prepared from this resin has poor flowability and a poor printing effect. If it is larger than 0.5 mol, it is difficult to add the carboxylic acid or its anhydride to the dicyclopentadiene resin, and the resulting resin has poor solubility in solvents and dry oils for use as vehicles. Accordingly, when these resins are used for preparing offset printing ink, the resulting ink has poor flowability and gives printed matter of poor gloss. Thus, these resins are not suitable for preparing printing ink.

If the unsaturated carboxylic acid or its anhydride is added in the amount within the above specified range to the dicyclopentadiene resin, an adduct can be formed at a conversion of nearly 100 percent, and therefore, it is not altogether necessary to remove the unreacted acid after the reaction. If desired, however, a trace of the unreacted acid may be removed by, for example, blowing a hot inert gas.

When the acid-modified resin used in this invention is to be produced by the one-step method, the ratio of the starting materials is preferably chosen so that 0.01 to 0.5 mol of the unsaturated carboxylic acid or its anhydride is added per 100 g of the cyclopentadiene, dicyclopentadiene or its alkyl-substituted derivative.

In accordance with this invention, the resulting acid-modified resin is then reacted with a phenol/formaldehyde resin. This reaction is carried out by heat melting the acid-modified resin or dissolving it in a hydrocarbon solvent such as benzene, toluene or xylene, then adding the phenolaldehyde resin to the acid-modified resin, and heating the reaction system at a temperature of, for example, 150° to 250°C. for 30 minutes to 10 hours.

The phenol-formaldehyde resin used is a resol-type phenol-formaldehyde resin obtained by reacting a phenol with formaldehyde in the presence of an alkali catalyst. It is necessary that this reaction be carried out at a temperature of 100° to 250°C. using at least 5 g of the phenol-formaldehyde resin per 100 g of the acid-modified resin. If the amount of the phenolformaldehyde resin is smaller than 5 g, the resulting resin has poor solubility in solvent, and the resulting ink has poor flowability and a poor printing effect. The upper limit of the amount of the phenol-formaldehyde resin is not particularly limited, but suitably, it is not more than 50 g. If it exceeds 50 g, there is a tendency toward an increase of misting, and the cost of production increases to disadvantage. If the reaction temperature is lower than 100°C., the reactivity between these resins is decreased, and an effective resin for printing ink cannot be obtained. If the reaction temperature is higher than 250°C., the resin obtained becomes deteriorated, and fails to meet the requirements of resins for printing ink as described hereinbefore.

It is necessary that the resin of this invention so obtained has a softening point of at least 100°C. If the softening point is lower than 100°C., misting occurs frequently, the drying speed of the ink is drastically reduced, and blocking tends to occur.

The novel inventive feature of this invention is that the acidmodified dicyclopentadiene resin prepared by adding an unsaturated carboxylic acid or its anhydride to an organic solvent-soluble dicyclopentadiene resin is further reacted with a phenol-formaldehyde resin.

The characteristic features of the present invention are as follows:

1. The resin obtained by the method of this invention can be used for preparing inks of various colors as a resin for an offset printing ink. This resin has printing effects and printability equal to, or superior to, those of the conventional rosin-modified phenol resins or alkylphenol resins. In addition, the resins of this invention can be produced at a lower cost than the rosin-modified phenol resins.

2. Offset printing inks can be produced by using the resin obtained by this invention in accordance with the same recipe and method of preparation as in the case of the conventional resins, and there is no need to install new equipment for preparation of inks. An offset printing ink can be obtained, for example, by dissolving 100 parts of the resin obtained by this invention in 0 to 150 parts of an oil such as a dry oil and 0 to 100 parts of a petroleum-type solvent at room temperature or at an elevated temperature to prepare a varnish having a viscosity of about 500 poises at room temperature, blending it with a pigment, and kneading them with a roll.

3. If desired, the resin obtained by the method of this invention can be used conjointly with the conventional resins.

4. Since the resin obtained is of a light color, the reproducibility of color is satisfactory for any kinds of pigments used, and the development of color also proves good.

5. The resin can be prepared by a relatively easy process, and the cost of production can be reduced.

The following Examples illustrate the present invention more specifically.

EXAMPLE 1

A 2l autoclave equipped with a stirrer was charged with 700 g of dicyclopentadiene having a purity of 97 percent and 300 g of mixed xylene of commercial grade, and they were reacted at 260° to 265°C. for 1.5 hours. After the reaction, the autoclave was cooled, and the contents were distilled to remove the unreacted dicyclopentadiene, oligomers and xylene to form 635 g of a dicyclopentadiene resin (I) having a softening point of 120°C. and a bromine value of 95.

The resulting resin (I) was placed in a reaction vessel equipped with a stirrer, and maleic anhydride was added in an amount of 6 g per 100 g of the resin (I) while the resin (I) was being melted by heating with stirring. The reaction between the resin (I) and the maleic anhydride was carried out for 3 hours to form an acid-modified resin (I-A) having a softening point of 139°C. and an acid value of 30.6.

Separately, 150 g of phenol, 135 g of formaldehyde and 7.5 g of a 26 percent aqueous solution of ammonia were placed in a flask equipped with a condenser, and reacted for 1 hour at the reflux temperature. The product was concentrated at reduced pressure to form a liquid phenol-formaldehyde resin.

To 100 g of the resin (I-A) being melted by heating with stirring was added 10 g of the resulting phenol-formaldehyde resin, and they were reacted for 1 hour at 190°C. Then, the temperature was raised to 200°C., and the reaction was continued for an additional one hour to form a resin (I-P) having a softening point of 159°C. and an acid value of 27.4.

EXAMPLE 2

Dicyclopentadiene (500 g) having a purity of 95 percent was reacted with 500 g of mixed xylene of commercial grade at 260°C. for 3 hours. After the reaction, the product was treated in the same way as in Example 1 to form a resin (II) having a softening point of 78°C. and a bromine value of 105.

Maleic anhydride (12 g) was added to 100 g of the resulting resin (II), and the mixture was charged into an autoclave equipped with a stirrer and reacted at 190°C. for 3 hours to form an acid-modified resin (II-A) having a softening point of 118°C. and an acid value of 55.0.

To 100 g of the resin (II-A) being melted by heating with stirring was added 20 g of the phenol-formaldehyde resin obtained in Example 1, and they were reacted at 220°C. for 1 hour to form a resin (II-P) having a softening point of 153°C. and an acid value of 51.8.

EXAMPLE 3

Dicyclopentadiene (800 g) having a purity of 95 percent was reacted with 200 g of mixed xylene of commercial grade at a temperature of 270°C. for 2.5 hours. After the reaction, the product was treated in the same way as in Example 1 to form 600 g of a resin (III) having a softening point of 143°C. and a bromine value of 90.

Tetrahydrophthalic anhydride (3 g) was added to 100 g of the resulting resin (III), and they were reacted at 220°C. for 5 hours to form an acid-modified resin (III-A) having a softening point of 149°C. and an acid value of 14.5.

To 100 g of the resin (III-A) was added 30 g of the phenolformaldehyde resin obtained in Example 1, and they were reacted at 200°C. for 2 hours to form a resin (III-P) having a softening point of 163°C. and an acid value of 12.0.

EXAMPLE 4

An autoclave was charged with 495 g of dicyclopentadiene having a purity of 95 percent, 205 g of acrylic acid and 300 g of mixed xylene, and they were reacted at 270°C. for 3 hours. After the reaction, the product was treated in the same way as in Example 1 to form an acid-modified resin (IV-A) having a softening point of 123°C. a bromine value of 76 and an acid value of 33.6.

To 100 g of the resulting resin (IV-A) was added 20 g of the phenol-formaldehyde resin obtained in Example 1, and they were reacted at 200°C. for 1.5 hours to form a modified resin (IV-P) having a softening point of 157.5°C. and an acid value of 29.5.

COMPARATIVE EXAMPLE 1

While 100 g of a petroleum resin (Nisseki Neopolymer 120, product of Nisseki Chemical Co., Ltd.) was being melted by heating, 20 g of the phenol-formaldehyde resin obtained in Example 1 was added, and they were reacted at 200°C. for 2 hours to form a modified resin having a softening point of 155°C.

COMPARATIVE EXAMPLE 2

While 100 g of a petroleum resin (Nisseki Neopolymer 160, product of Nisseki Chemical Co., Ltd.) was being melted by heating, 10 g of the phenol-formaldehyde resin obtained in Example 1 was added, and they were reacted at 210°C. for 1 hour to form a modified resin having a softening point of 175°C. and an acid value of 27.5.

A varnish was prepared from each of the resins obtained in Examples 1 to 4 and Comparative Examples 1 and 2 and a control resin which was a rosin-modified phenol resin (Hitanol 261, the product of Hitachi Chemical). Ink was prepared from the varnish, and the ink properties were tested.

PREPARATION OF VARNISHES

Linseed oil (70 g) was added to 100 g of the resin, and the mixture was heated at 230°C. for 2 hours. Then, 40 g of a petroleum-type hydrocarbon solvent (specific gravity 0.85, aniline point 72.8, initial distillation point 272°C., end point 308°C.) was added and uniformly mixed to form a varnish. In the case of the control resin the varnish was prepared by adding 70 g of linseed oil to 100 g of the resin, heating the mixture for 30 minutes, and then adding 30 g of the hydrocarbon solvent.

PREPARATION OF INK

Using three rolls, the following ingredients were kneaded. The amount of the petroleum-type hydrocarbon solvent was suitably varied so that the SR value of the ink became 17 to 18.

| Carmine 6B | 18 g |
|---|---|
| Vanish | 67 g |
| Solvent | 5 to 10 g |
| Abrasion-resistant compound | 3 g |
| Dryer for ink | 2 g |

PERFORMANCE TEST AND RESULT

1. Gloss: The ink (0.4 cc) was extended on art paper using an RI tester, and allowed to stand for 24 hours. Then, the gloss was measured by a 60°–60° glossmeter.
2. Setting time: After extending 0.4 cc of the ink on art paper using the above-mentioned IR tester, another sheet of art paper was superimposed on the ink-extended surface of the art paper. Using an RI tester roller, the degree of adhesion of the ink to the superimposed art paper was observed with the passage of time, and the time that elapsed until there was no adhesion of the ink was measured.
3. Misting: The ink (2.4 cc) was placed on Inkometer and it was rotated for 3 minutes at a speed of 1200 rpm. The degree of scattering of the ink to art paper placed under the roll was observed.
4. Drying time: The ink (0.4 cc) was spread on art paper using the above-mentioned RI tester, and then the drying time was measured by an ink drying tester.

The test results are shown in the following table.

| Type of the resin | Viscosity of the varnish (poises at 25°C.) | Gloss | Setting time (minutes) | Drying time (hours) | Misting |
|---|---|---|---|---|---|
| I-P | 350 | 56 | 10 | 6.0 | Not occurred |
| II-P | 520 | 62 | 10 | 5.0 | Not occurred |
| III-P | 470 | 60 | 13 | 6.5 | Not occurred |
| IV-P | 610 | 60 | 11 | 6.0 | Not occurred |
| Comparative resin 1 | 630 | 43 | 23 | 8.5 | Frequently occurred |
| Comparative resin 2 | 650 | 40 | 11 | 5.0 | Frequently occurred |
| Control resin | 450 | 58 | 17 | 5.5 | Not occurred |

What is claimed is:

1. A method for producing a resin for printing ink, which comprises reacting a cyclopentadiene resin obtained by heat-polymerizing at a temperature of 250°–350°C cyclopentadiene, dicyclopentadiene or an alkyl-substituted derivative thereof in the absence of a catalyst with an unsaturated carboxylic acid or its anhydride to form an acid-modified resin wherein the amount of the unsaturated carboxylic acid or its anhydride is 0.01 to 0.5 mol per 100 g of the cyclopentadiene resin, and reacting the acid-modified resin with a resol-type phenol-formaldehyde resin at a temperature of 100° to 250°C., the amount of the phenol-formaldehyde resin being at least 5 g per 100 g of the acid-modified resin, thereby to form a resin having a softening point of at least 100°C.

2. The method of claim 1 wherein the heat-polymerization is conducted in the presence of a solvent and the monomer concentration is adjusted to 30 to 80 percent by weight.

3. The method of claim 1 wherein the unsaturated carboxylic acid or its anhydride is a member selected from the group consisting of acrylic acid, methacrylic acid, maleic acid, maleic anhydride, tetrahydrophthalic acid, tetrahydrophthalic anhydride, fumaric acid, citraconic acid, and itaconic acid.

4. The method of claim 1 wherein the amount of the phenol-formaldehyde resin is not more than 50 g per 100 g of the acid-modified resin.

* * * * *